(12) United States Patent
Erhardt

(10) Patent No.: US 8,997,601 B2
(45) Date of Patent: Apr. 7, 2015

(54) STEERING COLUMN COMPRISING A STEERING BEARING, AND A STEERING BEARING OF A STEERING COLUMN

(75) Inventor: Herbert Erhardt, Herzogenaurach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 14/234,458

(22) PCT Filed: Aug. 1, 2011

(86) PCT No.: PCT/EP2011/063175
§ 371 (c)(1),
(2), (4) Date: Jan. 23, 2014

(87) PCT Pub. No.: WO2013/017156
PCT Pub. Date: Feb. 7, 2013

(65) Prior Publication Data
US 2014/0157938 A1  Jun. 12, 2014

(51) Int. Cl.
| B62D 1/16 | (2006.01) |
| F16C 33/58 | (2006.01) |
| F16C 19/54 | (2006.01) |
| F16C 25/08 | (2006.01) |
| F16C 27/04 | (2006.01) |
| F16C 19/16 | (2006.01) |
| F16C 19/06 | (2006.01) |

(52) U.S. Cl.
CPC .............. *B62D 1/16* (2013.01); *F16C 19/548* (2013.01); *F16C 25/08* (2013.01); *F16C 27/04* (2013.01); *F16C 33/588* (2013.01); *F16C 19/163* (2013.01); *F16C 2326/24* (2013.01); *F16C 19/06* (2013.01)

(58) Field of Classification Search
USPC ............ 74/492; 384/456, 490, 513, 516, 517, 384/535, 536, 537
See application file for complete search history.

(56) References Cited

U.S. PATENT DOCUMENTS

| 2,509,587 | A | * | 5/1950 | Creson .......................... 384/518 |
| 4,541,742 | A | * | 9/1985 | Lederman ..................... 384/518 |
| 5,193,917 | A | * | 3/1993 | Adler et al. ................... 384/517 |
| 5,458,422 | A | * | 10/1995 | Zernickel et al. ............. 384/505 |
| 5,531,526 | A | * | 7/1996 | Labedan et al. .............. 384/518 |

(Continued)

FOREIGN PATENT DOCUMENTS

| DE | 3808556 A1 | * | 9/1989 | .............. B62D 1/16 |
| DE | 100 27 513 A1 | | 12/2001 | |

(Continued)

*Primary Examiner* — Paul N Dickson
*Assistant Examiner* — Laura Freedman
(74) *Attorney, Agent, or Firm* — Davidson, Davidson & Kappel, LLC

(57) ABSTRACT

A steering column with a steering-column tube, a steering spindle and at least one steering bearing for the rotatable mounting of the steering spindle in the steering-column tube, the steering bearing having an outer ring sitting in the steering-column tube, an inner ring and rolling bodies arranged between the outer ring and a track section of the inner ring, wherein the inner ring bears against the steering spindle at only two points and, for this purpose, has a first section which axially adjoins the track section and bears under prestress against the steering spindle at the first point, and a second section which is axially spaced apart from the first section, which axially adjoins the track section, and which has a first end of the inner ring in interaction with the steering spindle at the second point.

5 Claims, 2 Drawing Sheets

(56) References Cited

U.S. PATENT DOCUMENTS

| | | | |
|---|---|---|---|
| 6,179,473 B1 | 1/2001 | Ponson et al. | |
| 6,224,265 B1 * | 5/2001 | Enomoto | 384/505 |
| 6,227,715 B1 * | 5/2001 | Erhardt et al. | 384/518 |
| 6,375,360 B1 * | 4/2002 | Weisskopf et al. | 384/538 |
| 6,416,229 B1 * | 7/2002 | Wolf | 384/516 |
| 6,913,391 B2 * | 7/2005 | Weisskopf et al. | 384/536 |
| 2005/0002593 A1 | 1/2005 | Weisskopf et al. | |
| 2013/0333511 A1 * | 12/2013 | Bussit et al. | 74/492 |
| 2014/0033856 A1 * | 2/2014 | Bussit et al. | 74/492 |
| 2014/0216197 A1 * | 8/2014 | Erhardt et al. | 74/492 |
| 2014/0345414 A1 * | 11/2014 | Erhardt et al. | 74/492 |

FOREIGN PATENT DOCUMENTS

| | | | | |
|---|---|---|---|---|
| DE | 10 2009 051 107 B3 | | 4/2011 | |
| EP | 636804 A1 * | | 2/1995 | F16C 35/06 |
| EP | 0941 414 B1 | | 9/1999 | |
| FR | 2704285 A1 * | | 10/1994 | F16C 19/52 |
| WO | WO 02/42655 | | 5/2002 | |
| WO | WO 2004/063577 | | 7/2004 | |

\* cited by examiner

STEERING COLUMN COMPRISING A STEERING BEARING, AND A STEERING BEARING OF A STEERING COLUMN

The invention concerns a steering column comprising at least one steering column tube, a steering spindle and at least one steering bearing for the rotatable mounting of the steering spindle in the steering column tube, said steering bearing comprising at least an outer ring seated in the steering column tube, an inner ring as also rolling elements arranged between the outer ring and a raceway section of the inner ring, the inner ring bearing at only two points against the steering spindle and comprising, for this purpose, a first section axially adjoining the raceway section and bearing under pre-stress against the first point on the steering spindle, and further comprising a second section which is spaced apart axially from the first section, which axially adjoins the raceway section and comprises a first end of the inner ring which interacts with the steering spindle at the second point. The invention further concerns a steering bearing for such a steering column.

BACKGROUND

Steering bearings are used in different designs. Often, the steering spindle is mounted, at least in the upper part of the steering column, with help of two angular contact ball bearings that are placed under pre-stress against each other. The angular contact ball bearings comprise bearing rings made out of sheet metal by cold forming.

As a rule, the outer ring is pressed directly into the steering tube. In case of high tolerances of the steering tube, this can also be seated with help of a tolerance ring in the tube. In both cases, as a rule, the axial positions of the outer rings are determined through an axial stop. As a rule, the axial stops are formed in each case by the end of the steering column tube.

The points at which the inner ring of the respective steering bearing is supported on the surface of the steering spindle are defined through the position of the steering spindle relative to the steering column tube and the permissible deviations of this position. However, the points are also influenced by the shape and dimension tolerances of the steering spindle, of the steering column tube, and of the steering bearings themselves, and, in the case of angular contact ball bearings, also by their elastic inward yielding during assembly.

The inner ring of a first steering bearing of the steering column is axially fixed on the steering spindle. The inner ring of a second steering bearing situated axially opposite the first steering bearing is biased against the balls of the second steering bearing through the spring force of one or more spring elements acting on a clamping ring. In this way, the inner ring is centered radially relative to the central axis of the steering spindle with help of the clamping ring and fixed on the steering spindle. The clamping ring keys itself with an edge radially between the inner ring and the surface of the steering spindle. The pre-stress of the spring element is maintained with help of a securing element which usually is an indented ring. The indented ring claws itself into the surface of the steering spindle.

In order to assure a cost-effective manufacturing, steering spindles comprise relatively large shape and dimension tolerances in the cylindrical outer contour. Dimension deviations of nominal values of up to ²/₁₀ mm or more can easily occur on the seat of the steering spindle through interaction with the inner ring. The clamping ring therefore comprises tolerance-compensating functions of a tolerance ring. Due to the tolerances, the diameter of the inner ring at the bearing seat on the steering spindle is therefore so large that, even in the case of unfavorable tolerance conditions, the inner ring and the clamping ring do not come directly into contact with each other at the shaft seat of the inner ring. At the shaft seat, the inner ring is supported through the clamping ring on the steering spindle.

One example of the above-described arrangement is shown in EP 0941 414 B1. The steering column in this arrangement comprises an angular contact ball bearing comprising a plastic clamping ring, a spring element configured as a wavy spring and a securing element configured as an indented ring.

Such arrangements have often stood the test. However, the multiplicity of parts of which the steering column is made, is a drawback with regard to storage, logistics and assembly. Therefore, efforts have been made in the past to reduce the multiplicity of parts to a minimum.

DE 100 27 513 A1 shows such an arrangement with an angular contact ball bearing whose inner ring is made in one piece with the securing element. The securing element is made after the manner of an indented ring with a plurality of peripherally spaced apart tabs all of which mostly have a sharp edge. In the non-assembled state of the angular contact ball bearing, the edges define a central recess that is described by a circular line and whose diameter is somewhat smaller, all tolerances taken into consideration, than the smallest outer diameter of the steering spindle so as to overlap this. Due to the overlap during pressing of the inner ring onto the steering spindle, the tabs claw themselves with the edges into the surface of the steering spindle and hold the inner ring in position. During this process, the tabs yield elastically inwards. Under certain circumstances, this, in itself good solution, can have a detrimental effect on the rigidity of the bearing arrangement. When the steering spindle is loaded by the steering wheel, the inner ring can either yield too strongly inwards thus causing an excessive inclination of the steering spindle, or the vibration behavior of the steering spindle can be disadvantageously influenced.

In the generic arrangement described in DE 10 2009 051 107 B3 therefore, a press fit of the inner ring on the steering spindle is provided in addition to the above-described securing ring. The inner ring of the arrangement described in DE 10 2009 051 107 B3 comprises, on one end, the securing element after the manner of an indented ring, and on the other end, a bearing seat. Due to the double support, the arrangement is more rigid. A raceway section for the rolling elements is configured axially between the securing element and the bearing seat. During mounting of the angular contact ball bearing, the inner ring is pressed with the bearing seat onto the steering spindle so that the tabs of the securing element claw themselves with the edges into the surface of the steering spindle.

SUMMARY OF THE INVENTION

It is an object of the invention to provide a steering column with a steering bearing that functions reliably and is simple to manufacture.

The steering column comprises at least one steering column tube, a steering spindle and at least one or two steering bearings of the invention. The steering spindle is mounted with help of two steering bearings in the steering column tube. Each steering bearing comprises an outer ring preferably fixed in the steering column tube, an inner ring as also rolling elements arranged between a raceway section of the outer ring and a raceway section of the inner ring. The rolling elements are balls that are preferably retained and/or guided in a ball cage. The raceway sections comprise for instance, respectively, an inner ball raceway or an outer ball raceway.

The steering bearing or bearings are angular contact ball bearings. By angular contact ball bearings a person skilled in the art understands bearings in which the contact lines, which extend through the rolling contact of the balls with the inner ball raceway on the inner ring and with the outer ball raceway on the outer ring as also through the ball centers, are inclined at an angle of contact to a radial plane. The ball centers are situated on a circumferential orbit in the radial plane. The angle of contact $\alpha$ is $90°>\alpha>0°$ and preferably in a range of $60°\geq\alpha\geq30°$.

The inner ring bears only at two points against the steering spindle, i.e. through one respective section at each point. The other sections of the inner ring are not supported radially on the steering spindle. The raceway section and possible transition or connecting sections associated to this define partially axially and partially radially a hollow annular space that is surrounded radially on the outside and axially on both sides by the inner ring and radially on the inner side by the steering spindle. The inner ring comprises a first section that axially adjoins the raceway section on one side, through which first section the angular contact ball bearing is supported at one of the two points on the steering spindle. The first section preferably has a hollow cylindrical configuration. Alternatively, the first section may also have a cross-section of any desired shape, for instance a quadrilateral configuration, and correspond with its geometry in this respect to a similar cross-section of the steering spindle. The first section is configured in form of a hub for enabling a press fit on the steering spindle so that it bears under press-stress against the steering spindle at one point. With help of the press fit of the first section, the inner ring is fixed axially and radially on the steering spindle.

At the second one of the two points, the inner ring is in contact with the steering spindle through a second section. The second section is axially spaced from the first section and axially adjoins the raceway section on the other side. The second section is formed for instance through a snug fit between the steering spindle and the inner ring or, similarly to the first point, through a press fit. Preferably, however, the second section comprises a securing element of an indented ring type with peripherally adjacent tabs or teeth. The tabs or teeth are separated from one another on the periphery through axial recesses that extend into the first end of the inner ring. The inner ring ends on one side at the first end. Each of the tabs or teeth comprises at least one edge that is at least partially clawed into the surface of the steering spindle. The inner ring is fixed axially on the steering spindle with help of the second section.

According to the invention, a third section of the inner ring made in one piece with the first section axially adjoins the first section. When the inner ring is seated on the steering spindle at the two points described above, the third section is radially out of contact with the steering spindle. The first section extends axially between the raceway section and the third section. The third section merges into a second end of the inner ring, which second end limits the inner ring and is without contact with the steering spindle. On the side turned away from the first end, the inner ring ends at the second end. When the inner ring is seated on the steering spindle, the third section and the second end extend about the central axis of the steering spindle peripherally directed and radially spaced from the surface of the steering spindle.

As initially described, the inner ring is seated with help of the first section with a press fit on the shaft. As already mentioned, steering spindles have relatively large shape and dimension tolerances in their outer contour. It is therefore difficult to realize the press fit of the first section. The stresses resulting in the first section from the press fit can become very high in an unfavorable tolerance situation, i.e. at a high overlap between the inner ring and the first section. In arrangements of the hitherto known prior art, the first section ends directly and abruptly at the second end which is thus exposed to a risk of crack formation due to the stresses created by the press fit in the material of the third section.

According to the invention, however, the first section that is under stress is adjoined by a third section that is not under stress because it has no contact with the steering spindle. The stresses resulting in the first section from the press fit continue at first beyond the first section into the third section because the first section and the third section are configured together in one piece and in one material. In the third section, the stresses "wear off" i.e. they diminish to normal, bearable magnitudes so that the third section can be designated as a relief section. Stress peaks in the inner ring of the prior art as described in the section "Background of the invention" are avoided because the inner ring no longer ends abruptly at the first section but merges into the relief section. The risk of crack formation is thus neutralized. This measure is optionally accompanied by the choice of a more ductile material for making the bearing rings or by a lower surface hardness of case hardened inner rings with a surface hardness of e.g. up to 500 HV in place of 680-700 HV.

The raceway section and the first section as also the raceway section and the second section either merge directly into each other or are connected to each other through intermediate sections. The inner ring is assembled together out of the individual sections, first section, raceway section, second section and third section by jointing or by positive engagement, or alternatively and preferably is configured in one piece and in one material out of the sections.

The inner ring and the outer ring are preferably shaped parts of sheet metal or strip material, for instance of the material C45 and possess, at least on the surface, a hardness of 470+100 HV. For manufacturing the lengthened inner ring according to the invention by cold forming methods such as drawing, the quantity of semi products required on the whole is not more or only negligibly more than in the case of drawing of the inner ring known from the prior art, because a large part of the section can be created through stretching the material of the initial thickness to a smaller wall thickness.

For reducing stresses, the third section must possess an adequate axial dimension. According to one embodiment of the invention therefore, the third section has an axial width that is at least exactly equal to the axial width of the first section.

Further features of the invention relate to the geometric design or proportions of the inner ring of the steering bearing In a further embodiment of the invention, the third section widens funnel-like towards the second end, and the inner dimensions of the third section increase in direction of the second end. As a centering opening in form of an insertion bevel, the widening can be utilized for placing the inner ring on the steering spindle.

According to one provision of the invention, the smallest radial inner dimensions of the third section are larger than the largest radial inner dimensions of the first section. In this way, a contact between the third section and the steering spindle is reliably avoided.

According to a further provision, the radial outer dimensions of the first section are larger than those of the third section at least at the point where the third section axially adjoins the first section. Accordingly, the wall thickness of the first section in radial directions is larger than the wall thickness of the third section. This can be of advantage for forming a reliable press fit.

DETAILED DESCRIPTION

Figure 1:
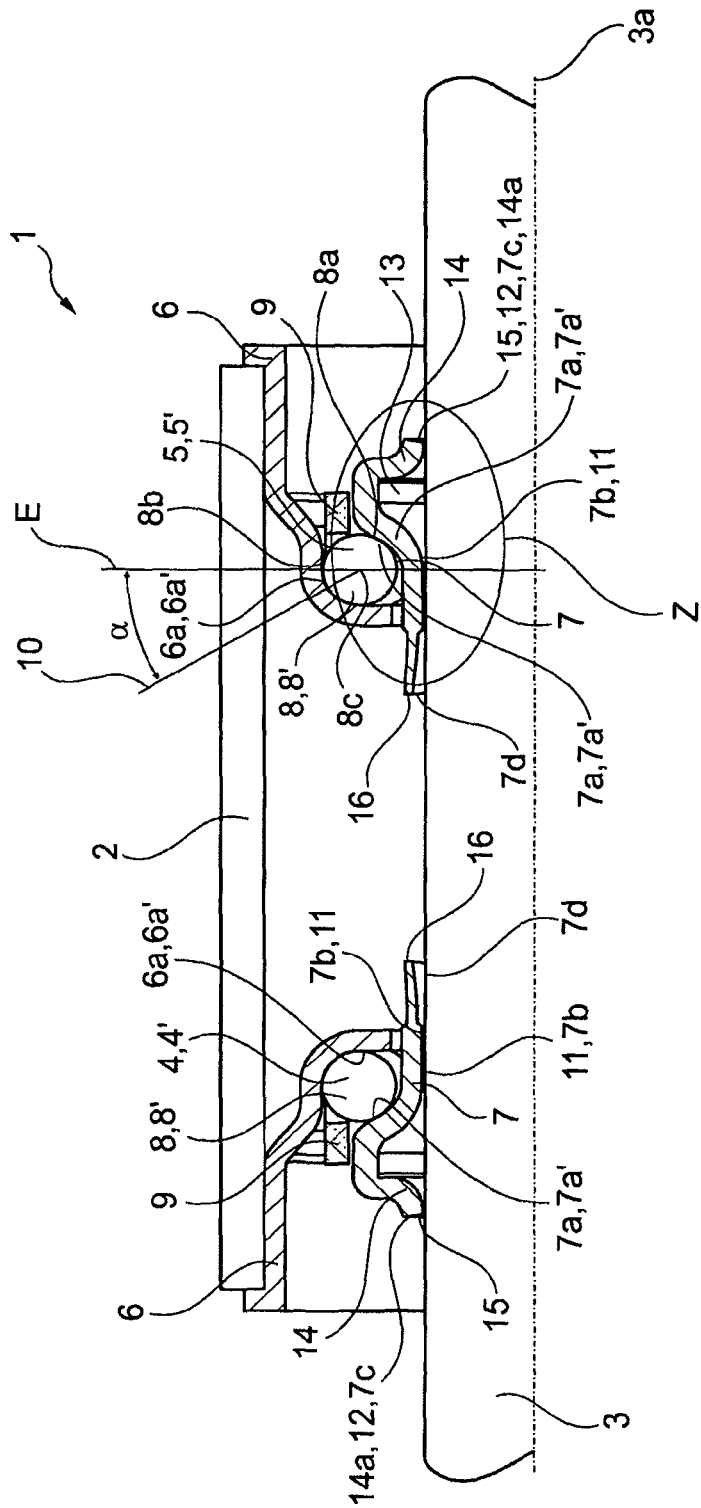
FIG. 1 shows a steering column 1 in a semi-section taken in longitudinal direction above a central axis 3a, and shown in a simplified illustration.
Figure 2:
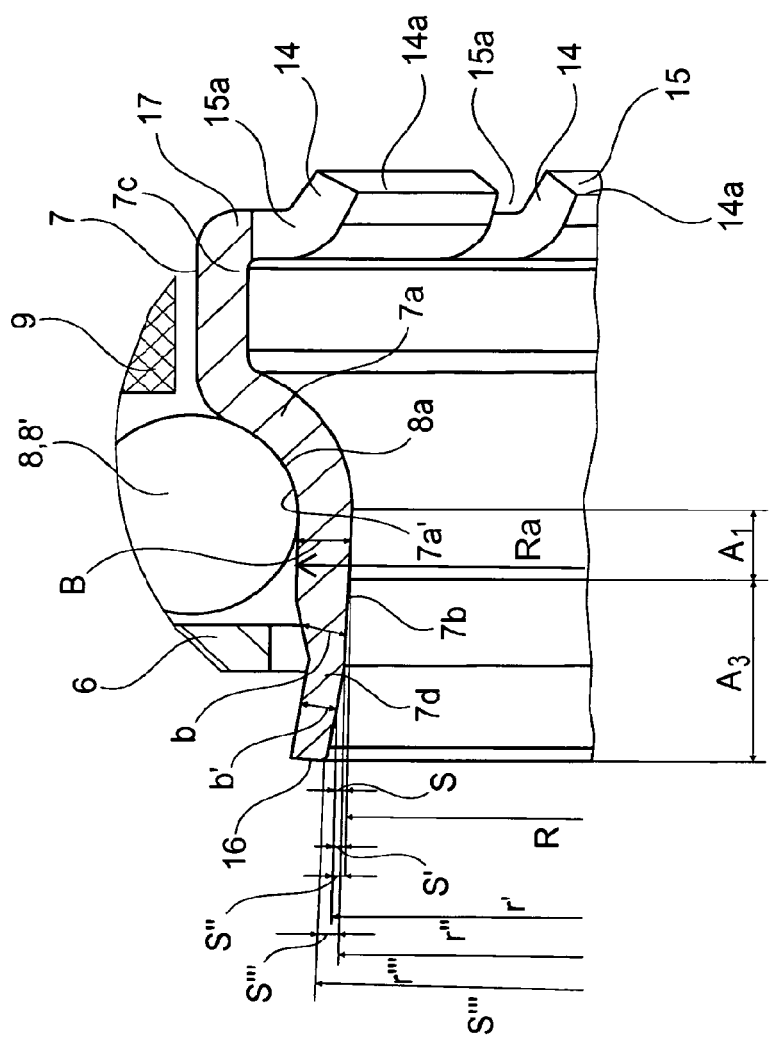
FIG. 2 shows the detail Z of FIG. 1 in an enlarged and not-to-scale illustration.

FIGS. 1 and 2: The steering column 1 comprises a steering column tube 2, a steering spindle 3 and two steering bearings 4 and 5 according to the invention. The steering spindle 3 is mounted with help of the steering bearings 4 and 5 in the steering column tube 2. Each of the steering bearings 4 and 5 comprises an outer ring 6 firmly seated in the steering column tube, an inner ring 7 as also rolling elements 8 in form of balls 8' arranged between a raceway section 6a of the outer ring 6 and a raceway section 7a of the inner ring 7. The balls 8' are spaced apart uniformly in peripheral direction about the central axis 3a and are retained and guided in a ball cage 9. The raceway sections 6a and 7a are substantially formed by the ball raceways 6a' and 7a'.

FIG. 1: The steering bearings 4 and 5 are angular contact ball bearings 4' and 5'. The contact lines 10 extending through the rolling contact 8a of the balls 8' with the inner ball raceway 7a' on the inner ring 7 and through the rolling contact 8b with the outer ball raceway 6a' on the outer ring 6 as also through the respective ball center 8c are inclined at a contact angle $\alpha$ to a radial plane E wherein $\alpha = 45°$.

The inner ring 7 bears against the steering spindle 3 only at two points 11 and 12. The other part of the inner ring 7, particularly the raceway section 7a is not supported radially on the steering spindle 3 but a hollow annular space 13 is defined radially on the outside and axially on both sides by the inner ring 7 and radially on the inside by the steering spindle 3.

The inner ring 7 comprises a first section 7b that axially adjoins the raceway section 7a on the one side and is configured in one material with this raceway section 7a, through which first section 7b the respective angular contact ball bearing 4' or 5' is supported on the steering spindle 3 at a first point 11 of the two points 11 and 12. The first section 7b has a hollow cylindrical configuration and is designed in form of a hub to enable a press fit on the steering spindle 3 so that the first section 7b bears under pre-stress at this point 11 against the steering spindle 3.

At the second point 12, the inner ring 7 is in contact with the steering spindle 3 through a second section 7c that is made in one material with the raceway section 7a. The second section 7c is axially spaced from the first section 7b and axially adjoins the raceway section 7a on the other side.

FIG. 2: The second section 7c comprises securing element 17 configured after the manner of an indented ring comprising peripherally neighboring tabs 14. The tabs 14 are separated from one another in peripheral direction through axial recesses 15a that extend into the first end 15. Each of the tabs 14 comprises an edge 14a provided for clawing itself at least partially into the surface of the steering spindle 3 at the point 12.

FIGS. 1 and 2: According to the invention, a third section 7d of the inner ring 7 configured in one piece with the first section 7b axially adjoins the first section 7b. The third section 7d is without contact with the steering spindle 3 in radial direction and merges in axial direction into a second end 16 of the inner ring 7, which second end 16 is without contact with the steering spindle 3 and limits the inner ring 7.

FIG. 2: The third section 7d and the second end 16 extend, directed towards the periphery, about the central axis 3a with an infinite number of axially successive radial distances s, s', s", s'" ... from the radius of the steering spindle 3 or from the inner radius R of the first section 7b.

The third section 7d widens funnel-like in direction of the second end so that a hollow-conical formation is created. The inner dimensions r', r" ... of the third section 7d increase in direction of the second end 16. As a centering opening in form of an insertion bevel, the widening can be utilized for placing the inner ring on the steering spindle. The smallest radial inner dimensions r of the third section 7d are larger than the largest inner radius R of the first section 7b.

According to a further proposition of the invention, the radial outer dimensions Ra of the first section 7b are larger than the outer dimensions of the third section 7d at that point where the third section 7d axially adjoins the first section 7b. Thus, the wall thickness B of the first section 7b in radial directions is larger than the wall thicknesses b, b' ... of the third section 7d.

The axial width $A_3$ of the third section 7d is larger than the width $A_1$ of the first section 7b.

What is claimed is:

1. A steering column comprising:
   at least one steering column tube;
   a steering spindle; and
   at least one steering bearing for a rotatable mounting of the steering spindle in the steering column tube, the steering bearing including at least an outer ring seated in the steering column tube, an inner ring, and rolling elements arranged between the outer ring and a raceway section of the inner ring, the inner ring bearing only at a first and a second point against the steering spindle and including a first section axially adjoining the raceway section and bearing under pre-stress against the first point on the steering spindle, and further comprising a second section axially spaced apart from the first section and axially adjoining the raceway section and including a first end of the inner ring interacting with the steering spindle at the second point, a third section made in one piece with the first section axially adjoining the first section without contact with the steering spindle in a radial direction so that the first section extends axially between the raceway section and the third section and that the third section merges into a second end of the inner ring, the second end of the inner ring without contact with the steering spindle;
   wherein the third section has an axial width at least equal to an axial width of the first section.

2. The steering column as recited in claim 1 wherein the third section widens as a funnel towards the second end.

3. A steering column comprising:
   at least one steering column tube;
   a steering spindle; and
   at least one steering bearing for a rotatable mounting of the steering spindle in the steering column tube, the steering bearing including at least an outer ring seated in the steering column tube, an inner ring, and rolling elements arranged between the outer ring and a raceway section of the inner ring, the inner ring bearing only at a first and a second point against the steering spindle and including a first section axially adjoining the raceway section and bearing under pre-stress against the first point on the steering spindle, and further comprising a second section axially spaced apart from the first section and axially adjoining the raceway section and including a first end of the inner ring interacting with the steering spindle at the second point, a third section made in one piece with the first section axially adjoining the first section without contact with the steering spindle in a radial direction so that the first section extends axially between the raceway section and the third section and that the third section merges into a second end of the inner ring, the second end of the inner ring without contact with the steering spindle, wherein the inner ring includes at least one edge on the first end, the edge interacting at the second point with a surface of the steering spindle, and wherein the at least one edge includes at least two edges interacting at the second point with the surface of the steering spindle, each one of the edges being configured on a respective tooth-shaped tab configured in one piece with the inner ring and that the at least two tabs are separated from each other in a peripheral direction through recesses configured on the first end.

4. A steering bearing for a steering column having at least one steering column tube and a steering spindle, the steering bearing for a rotatable mounting of the steering spindle in the steering column tube and comprising:

at least an outer ring seated in the steering column tube, an inner ring, and rolling elements arranged between the outer ring and a raceway section of the inner ring, the inner ring bearing only at a first and a second point against the steering spindle and including a first section axially adjoining the raceway section and bearing under pre-stress against the first point on the steering spindle, and further comprising a second section axially spaced apart from the first section and axially adjoining the raceway section and including a first end of the inner ring interacting with the steering spindle at the second point, a third section made in one piece with the first section axially adjoining the first section without contact with the steering spindle in a radial direction so that the first section extends axially between the raceway section and the third section and that the third section merges into a second end of the inner ring, the second end of the inner ring without contact with the steering spindle, a smallest radial inner dimension of the third section being larger than a largest radial inner dimension of the first section;

wherein radial outer dimensions of the first section are larger than those of the third section at least at a point where the third section axially adjoins the first section.

5. The steering bearing as recited in claim 4 wherein a radial wall thickness of the third section is smaller than a radial wall thickness of the first section at least at the point where the third section axially adjoins the first section.

* * * * *